(12) United States Patent
Kang et al.

(10) Patent No.: US 9,348,073 B2
(45) Date of Patent: May 24, 2016

(54) PHOTOREACTIVE MATERIAL LAYER AND METHOD OF MANUFACTURING THE SAME

(75) Inventors: Suk Hoon Kang, Seoul (KR); Jun Woo Lee, Seongnam-si (KR); Kyoung Tae Kim, Osan-si (KR); Soo-Ryun Cho, Seongnam-si (KR); Mi Hwa Lee, Seoul (KR); Baek Kyun Jeon, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 105 days.

(21) Appl. No.: 13/534,968

(22) Filed: Jun. 27, 2012

(65) Prior Publication Data
US 2013/0211029 A1 Aug. 15, 2013

(30) Foreign Application Priority Data
Feb. 13, 2012 (KR) .......................... 10-2012-0014488

(51) Int. Cl.
C09K 19/00 (2006.01)
G02B 5/30 (2006.01)
G02B 27/22 (2006.01)

(52) U.S. Cl.
CPC ............ *G02B 5/3016* (2013.01); *G02B 5/3083* (2013.01); *G02B 5/3025* (2013.01); *G02B 27/2214* (2013.01)

(58) Field of Classification Search
CPC .. G02B 5/3016; G02B 5/3025; G02B 5/3083; C09K 19/00
USPC .............. 428/1.1, 1.2; 349/123; 527/457, 487, 527/508
See application file for complete search history.

(56) References Cited

U.S. PATENT DOCUMENTS

| 6,659,827 | B2 | 12/2003 | Kim |
| 7,125,655 | B2 | 10/2006 | Mun et al. |
| 7,897,003 | B2 | 3/2011 | Tashiro |
| 2009/0146105 | A1 | 6/2009 | Oh et al. |
| 2013/0211029 | A1* | 8/2013 | Kang et al. .................... 526/313 |

FOREIGN PATENT DOCUMENTS

| JP | 06092016 A | 4/1994 |
| JP | 2000212310 A | 8/2000 |
| JP | 2000267103 A | 9/2000 |
| JP | 2001117239 A | 4/2001 |
| JP | 2002202407 A | 7/2002 |
| JP | 2002229000 A | 8/2002 |
| JP | 2003307617 A | 10/2003 |
| JP | 2005232345 A | 9/2005 |
| JP | 2006053086 A | 2/2006 |
| JP | 3951622 B2 | 5/2007 |
| JP | 2007304215 A | 11/2007 |
| JP | 2008175877 A | 7/2008 |
| JP | 2008276149 A | 11/2008 |
| JP | 4595362 B2 | 10/2010 |
| JP | 2011048239 A | 3/2011 |
| KR | 1020030089919 A | 11/2003 |
| KR | 1020060112067 A | 10/2006 |
| KR | 1020070079861 A | 8/2007 |

OTHER PUBLICATIONS

Kawatsuki, et al.; Influence of Alkylene Spacer Lenth on Thermal Enhancement of Photoinduced Optical Anisotropy in Photo-Cross-Linkable Liquid Crystalline Polymeric Films and Their Composites with Non-Liquid-Crystalline Monomers; Macromolecules; American Chemical Society; 2007; pp. 6355-6360.

Kawatsuki, et al.; Thermally Enhanced Photoinduced In-Plane Reorientation in Photo-Cross-Linkable Polymer Liquid Crystalline Films and its Application to Linear Polarizer; Journal of Polymer Science: Part A: Polymer Chemistry, vol. 46, 2008; pp. 4712-4718.

Kawatsuki, et al.; A photoinduced Birefringent Film with a High Orientational Order Obtained from a Novel Polymer Liquid Crystal; Advanced Materials, No. 17; Sep. 3, 2001; pp. 1337-1339.

Kawatsuki, et al.; Reversion of Alignment Direction in the Thermally Enhanced Photoorientation of Photo-Cross-Linkable Polymer Liquid Crystal Films; American Chemical Society; Macromolecules 2002, 35; pp. 706-713.

* cited by examiner

*Primary Examiner* — Geraldina Visconti
(74) *Attorney, Agent, or Firm* — Cantor Colburn LLP

(57) ABSTRACT

A photoreactive material layer includes an upper portion and a lower portion each including a uniformly aligned crosslinked photoreactive material, wherein the upper portion includes a first portion of the crosslinked photoreactive material and a second portion of the crosslinked photoreactive material, wherein the first portion of the photoreactive material and the second portion of the crosslinked photoreactive material are crosslinked with each other and aligned in a first direction, and the lower portion includes a third portion of the crosslinked photoreactive material and a fourth portion of the crosslinked photoreactive material, wherein the third portion of the crosslinked photoreactive material and the fourth portion of the crosslinked photoreactive material are crosslinked with each other and aligned in the first direction.

19 Claims, 13 Drawing Sheets

PHOTOREACTIVE MATERIAL LAYER AND METHOD OF MANUFACTURING THE SAME

CROSS-REFERENCE TO RELATED APPLICATION

This application claims priority to Korean Patent Application No. 10-2012-0014488, filed on Feb. 13, 2012, and all the benefits accruing therefrom under 35 U.S.C. §119, the content of which in its entirety is herein incorporated by reference.

BACKGROUND (a) Field of the Invention

A photoreactive material layer and a method of manufacturing the same are provided.

(b) Description of the Related Art

A photoreactive material includes molecules aligned by light, such as ultraviolet light. For example, the photoreactive material includes a main chain and a plurality of side chains connected thereto, and dimerization of the side chains including a photoreactive group induces alignment of other side chains therearound.

A layer where the photoreactive material is aligned may be used as a member of a device, such as an alignment layer of a liquid crystal display, a film type patterned retarder ("FPR") of a stereoscopic image display device, a quarter wavelength plate ("QWP") of a stereoscopic image display device, or a polarizer of a liquid crystal display.

SUMMARY

An exemplary embodiment provides a photoreactive material layer, including: an upper portion and a lower portion each including a uniformly aligned crosslinked photoreactive material, wherein the upper portion includes a first portion of the crosslinked photoreactive material and a second portion of the crosslinked photoreactive material, wherein the first portion of the crosslinked photoreactive material and the second portion of the crosslinked photoreactive material are crosslinked with each other and aligned in a first direction, and the lower portion includes a third portion of the crosslinked photoreactive material and a fourth portion of the crosslinked photoreactive material, wherein the third portion of the crosslinked photoreactive material and the fourth portion of the crosslinked photoreactive material are crosslinked with each other and aligned in the first direction.

The first portion of the crosslinked photoreactive material may include a first main chain and a first side chain connected to the first main chain, wherein the first main chain or the first side chain may include a first photoreactive group, the second portion of the crosslinked photoreactive material may include a second main chain and a second side chain connected to the second main chain, wherein the second main chain or the second side chain may include a second photoreactive group, the third portion of the crosslinked photoreactive material may include a third main chain and a third side chain connected to the third main chain, wherein the third main chain or the third side chain may include a third photoreactive group, the fourth portion of the crosslinked photoreactive material may include a fourth main chain and a fourth side chain connected to the fourth main chain, wherein the fourth main chain or the fourth side chain may include a fourth photoreactive group, the first photoreactive group and the second photoreactive group may be connected to each other, and the third photoreactive group and the fourth photoreactive group may be connected to each other.

The first main chain, the second main chain, the third main chain, and the fourth main chain may be aligned in the first direction.

Each of the first to fourth portions of the crosslinked photoreactive materials may include a vertical functional group.

The photoreactive material may be a photoreactive liquid crystal polymer.

Another exemplary embodiment provides a method of manufacturing a photoreactive material layer, the method including: coating a photoreactive material composition including a photoreactive material on a substrate; annealing the photoreactive material composition to form an annealed composition; radiating light on upper and lower surfaces of the annealed composition to form a crosslinked photoreactive material; and annealing the crosslinked photoreactive material to manufacture the photoreactive material layer.

The radiating of light may crosslink the photoreactive material.

The annealing of the crosslinked photoreactive material reorients and aligns the photoreactive material in a first direction.

Light may be simultaneously or sequentially radiated on the upper and lower surfaces of the photoreactive material layer.

Light may be radiated in an inclination direction on at least one of the upper and lower surfaces of the photoreactive material layer.

Light may be radiated on the upper and lower surfaces of the photoreactive material layer by light sources having different energies or light sources having different wavelengths.

Light may be radiated on the upper and lower surfaces of the photoreactive material layer by differently polarized light sources.

Light may be radiated on the upper and lower surfaces of the photoreactive material layer by a single light source and a beam splitter.

Light may be radiated on the upper and lower surfaces of the photoreactive material layer to have different azimuths.

DETAILED DESCRIPTION

Figure 1A:
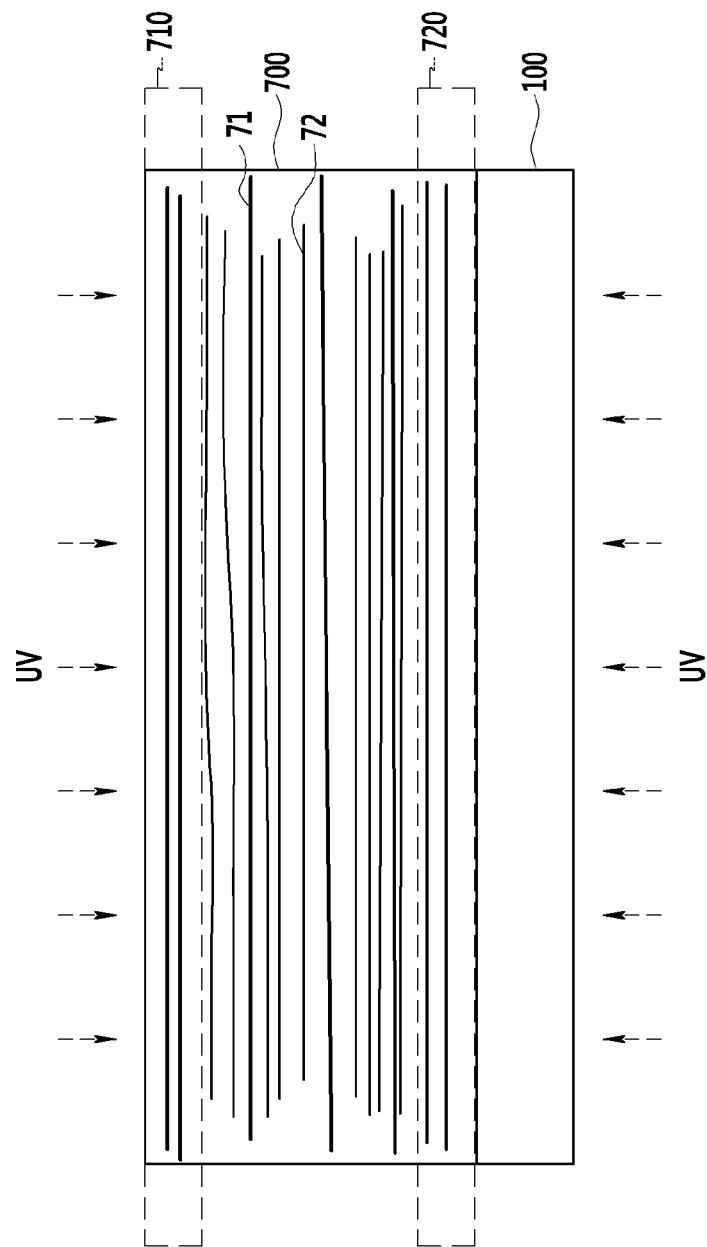
FIG. 1A is a cross-sectional view schematically illustrating an embodiment of a photoreactive material layer.

Hereinafter, exemplary embodiments of the present disclosure will be described more fully with reference to the accompanying drawings, in which exemplary embodiments of the invention are shown. As those skilled in the art would realize, the disclosed embodiments may be modified in various different ways, all without departing from the spirit or scope of the present disclosure. The drawings and description are to be regarded as illustrative in nature and not restrictive. Like reference numerals designate like elements throughout the specification. Further, the detailed description of the widely known technologies will be omitted.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present. It will be understood that when an element such as a layer, film, region, or substrate is referred to as being "beneath" another element, it may be directly beneath the other element or intervening elements may also be present. In contrast, when an element is referred to as being "directly beneath" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular, orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" means a straight or branched chain, saturated, monovalent hydrocarbon group (e.g., methyl or hexyl).

"Alkylene" means a straight or branched chain, saturated, divalent aliphatic hydrocarbon group, (e.g., methylene ($—CH_2—$) or, propylene ($—(CH_2)_3—$)).

"Alkoxy" means an alkyl group that is linked via an oxygen (i.e., alkyl-O—), for example methoxy, ethoxy, and sec-butyloxy groups.

"Arylene" means a divalent group formed by the removal of two hydrogen atoms from one or more rings of an arene, wherein the hydrogen atoms may be removed from the same or different rings (e.g., phenylene or napthylene).

"Imide" means a group having two carbonyl groups bound to nitrogen, e.g., succinimide.

"Steroid" means a group having three cyclohexane rings and one cyclopentane ring joined to each other, e.g., cholestane.

A photoreactive material layer will be further described in detail with reference to FIGS. 1A and 1B.

Figure 1B:
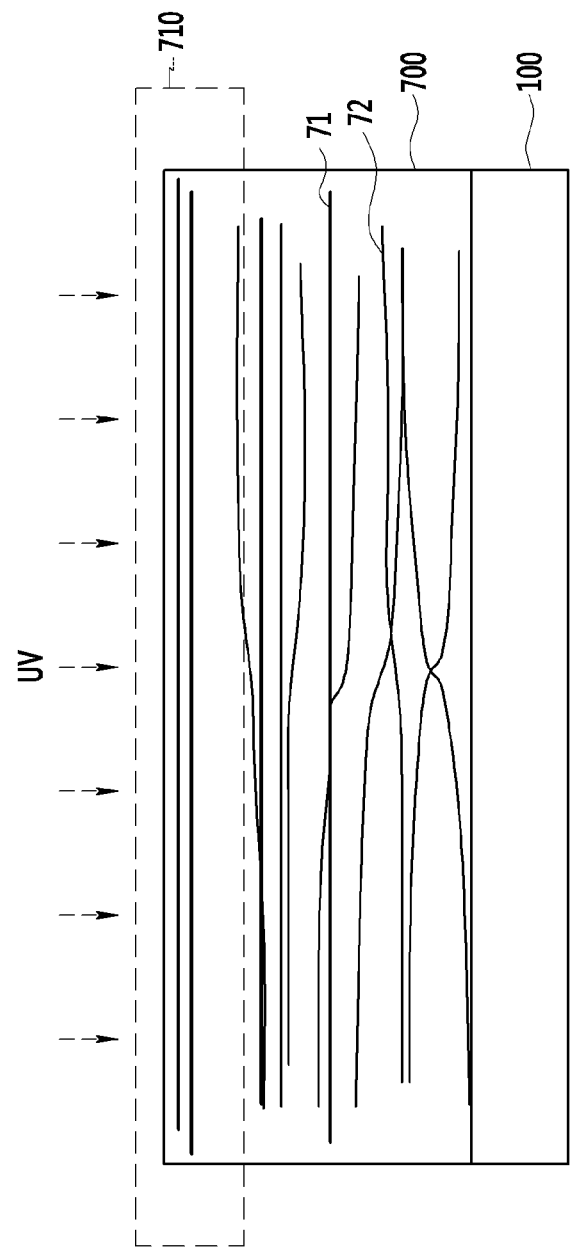
FIG. 1B is a cross-sectional view schematically illustrating a photoreactive material layer in the related art.

FIG. 1A is a cross-sectional view schematically illustrating a photoreactive material layer, and FIG. 1B is a cross-sectional view schematically illustrating a photoreactive material layer in the related art.

A photoreactive material layer 700 is disposed on a substrate 100. The substrate 100 may comprise a transparent material, such as a glass or a plastic. The photoreactive material layer 700 may include a uniformly aligned crosslinked photoreactive material comprising first and second portions of the crosslinked photoreactive material 71 and 72, respectively. For example, as illustrated in FIG. 1A, when light, such as ultraviolet light, is radiated on both surfaces of an upper surface 710 and a lower surface 720 of the photoreactive material layer 700, and the photoreactive material layer 700 is annealed, and the first and second portions of the photoreactive material 71 and 72 in the upper and lower portions of the photoreactive material layer 700 may be uniformly aligned. Since the alignment properties of the first and second portions of the crosslinked photoreactive material 71 and 72 are uniform on the surface and in the inside of the photoreactive material layer 700, retardation may be increased, and a refractive index (Δn) may be increased. In addition, a black light leakage phenomenon may be decreased, and white luminance may be increased, such that a contrast ratio may be increased.

An alignment direction may be provided by first aligning the first and second portions of the photoreactive material 71 and 72 disposed in the upper and lower portions of the photoreactive material layer 700 using a low exposure energy, and the first and second portions of the photoreactive material 71 and 72 may move to be aligned by thermal energy on both the upper and lower portions of the photoreactive material layer 700. For example, an alignment axis may be stably formed on both the upper and lower portions of the photoreactive material layer 700 through the exposure of the upper and lower surfaces by a small exposure quantity, and the alignment of the first and second portions of the photoreactive material 71 and 72 may be induced by heat on the basis of the alignment axis. Accordingly, rigidity of the first and second portions of the photoreactive materials 71 and 72 may be increased in the upper and lower portions of the photoreactive material layer 700, and an alignment induction effect may be increased by a decrease in a side reaction due to light.

In contrast, as illustrated in FIG. 1B, when light is radiated only on the upper surface 710 of the photoreactive material layer 700 and the photoreactive material layer 700 is annealed, the alignment properties of the photoreactive material 71 are uniform in the upper portion of the photoreactive material layer 700, and the alignment properties of the photoreactive material 71 are not uniform in the lower portion thereof. Since the alignment properties of the first and second portions of the photoreactive materials 71 and 72 are not uniform on the surface and in the inside of the photoreactive material layer 700, the retardation may be decreased, and a refractive index (Δn) may be decreased. Further, a black light leakage phenomenon may be increased, and white luminance may be decreased, such that a contrast ratio may be decreased. The alignment properties of the second portion of the photoreactive material 72 disposed on the lower surface of the photoreactive material layer 700 may be deteriorated, and the alignment induction by heat may be deteriorated on both the upper and lower portions of the photoreactive material layer 700. In addition, even in an embodiment wherein the radiation quantity of light is increased during a single surface exposure, a side reaction due to light may increase to decrease the alignment properties on both the upper and lower portions of the photoreactive material layer 700.

A method of manufacturing the photoreactive material layer will be described in further detail with reference to FIGS. 2 to 5.

FIGS. 2 to 5 are views sequentially illustrating an embodiment of a method of manufacturing the photoreactive material layer.

Figure 2:
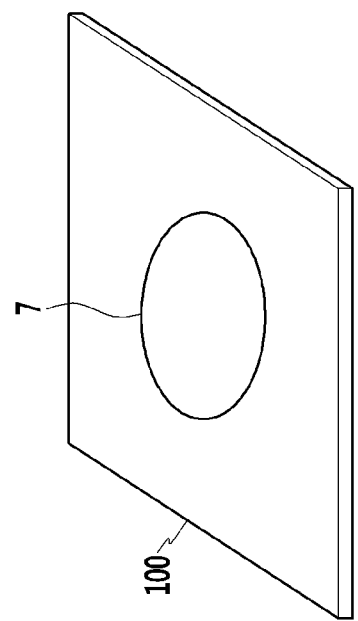
FIGS. 2 to 5 are views sequentially illustrating an embodiment of a method of manufacturing the photoreactive material layer.
Figure 5:
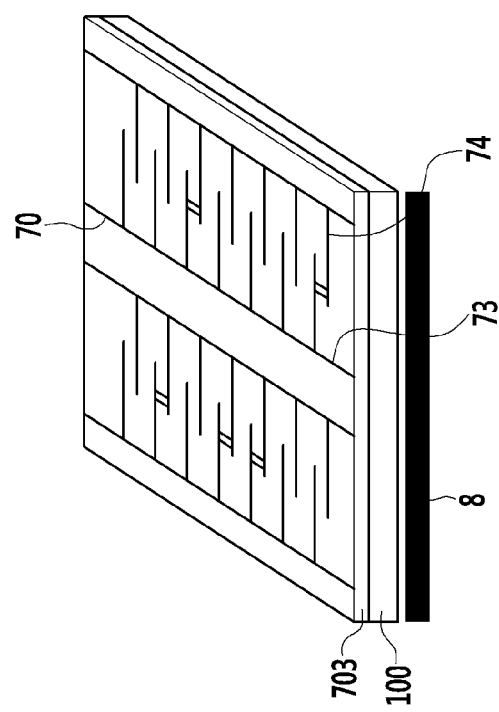

Referring to FIG. 2, a photoreactive material composition 7 is coated on the substrate 100. The photoreactive material composition 7 may be applied by a method such as spin coating, dip coating, or spray coating. The photoreactive material composition 7 includes a photoreactive material 70 and a solvent. Referring to FIG. 5, the photoreactive material 70 includes at least one main chain 73 and at least one side chain 74 connected to at least one main chain, the side chain may include at least one photoreactive group, and the main chain may include at least one photoreactive group. The photoreactive material composition 7 may further include a monomer, and the monomer may include a photoreactive group. Further, at least one of the main chain and the side chain may include at least one vertical functional group. For example, the photoreactive material 70 may be a photoreactive liquid crystal polymer. For example, the photoreactive material 70 may be an acrylic compound, a methacrylic compound, a siloxane-based compound, or a maleimide-based compound.

The photoreactive group is a functional group that directly causes a photo-dimerization reaction or a photo-isomerization reaction when radiated with light, such as ultraviolet light. For example, the photoreactive group may include at least one of an azo-based functional group, a cinnamate-based functional group, a chalcone-based functional group, a coumarin-based functional group, a maleimide-based functional group, or a stilbene-based functional group.

The vertical functional group is a functional group exhibiting liquid crystal properties. For example, the vertical functional group may include at least one of a $C_1$-$C_{25}$ alkylene group substituted by a $C_1$-$C_{10}$ alkyl group or a $C_1$-$C_{10}$ alkoxy group, a $C_1$-$C_{25}$ arylene group substituted by an alkyl group or a $C_1$-$C_{10}$ alkoxy group, a $C_1$-$C_{25}$ cyclohexylene group substituted by a $C_1$-$C_{10}$ alkyl group or a $C_1$-$C_{10}$ alkoxy group, an imide ring group, a steroid group, an aromatic liquid crystal group, or a cholesteric group. In the vertical functional group, at least one arylene group and at least one cyclohexylene group may be connected to each other directly or through the $C_1$-$C_{25}$ alkylene group.

The solvent may be an organic solvent. For example, examples of the organic solvent include cyclopentanol; a halogenated solvent such as 1-chlorobutane, chlorobenzene, 1,1-dichloroethane, 1,2-dichloroethane, chloroform, or 1,1,2,2-tetrachloroethane; an ether-based solvent such as diethyl ether, tetrahydrofuran, or 1,4-dioxane; a ketone-based solvent such as methyl ethyl ketone ("MEK"), acetone, or cyclohexanone; an acetate-based solvent such as propylene glycol monomethyl ether acetate (PGMEA); an ester-based solvent such as ethyl acetate; an acetate-based solvent such as γ-butyrolactone; a lactone-based solvent such as an ester-based solvent such as ethyl acetate; a carbonate-based solvent such as ethylene carbonate or propylene carbonate; an amine-based solvent such as triethylamine or pyridine; a nitrile-based solvent such as acetonitrile; an amide-based solvent such as N,N'-dimethyl formamide ("DMF"), N,N'-dimethyl acetamide ("DMAc"), tetramethylurea, or N-methylpyrrolidone ("NMP"); a nitro-based solvent such as nitromethane or nitrobenzene; a sulfide-based solvent such as dimethyl sulfoxide ("DMSO") or sulfolane; or a phosphate-based solvent such as hexamethylphosphoric amide or tri-n-butyl phosphate. One or more solvents may be used in combination.

Figure 3:
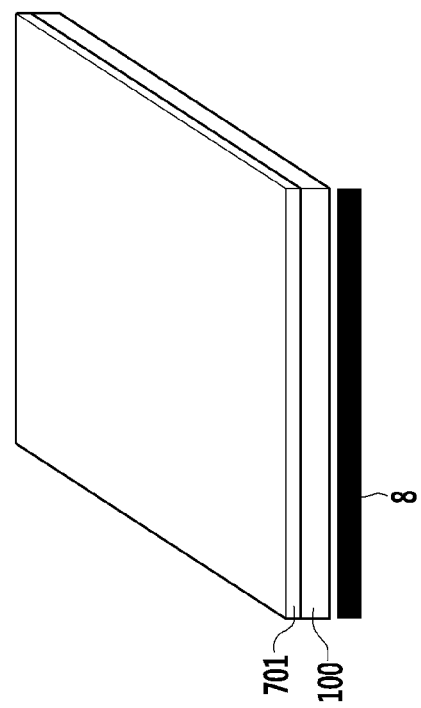

Referring to FIG. 3, the photoreactive material composition 701 is annealed by using a heating source 8, such that the solvent may be removed to form an annealed composition 702. This annealing step can be called a prebake.

Figure 4:
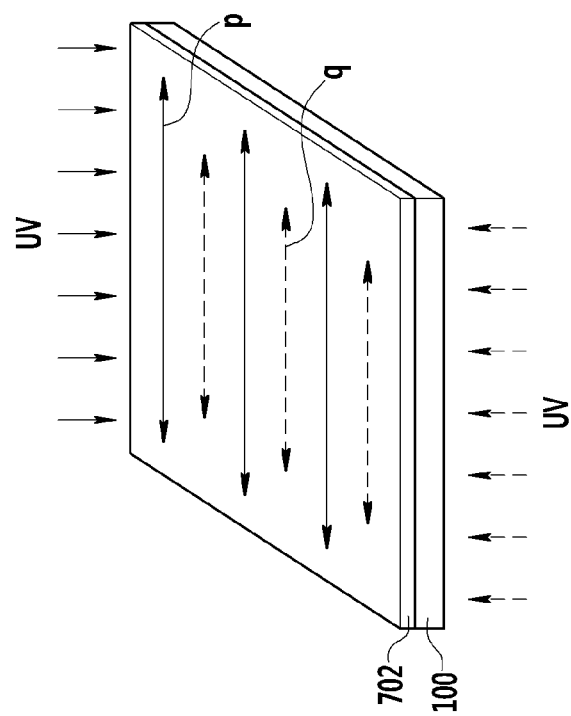

Referring to FIG. 4, light, such as ultraviolet ("UV") light may be radiated on both surfaces of the annealed composition 702, such that the photoreactive group in the side chain of the photoreactive material 70 may be crosslinked with the photoreactive group in another side chain to form a crosslinked photoreactive material 703. For example, a portion of the photoreactive material 70 on the upper surface may be aligned in a p direction by light radiated on the upper surface, and another portion of the photoreactive material 70 on the lower surface may be aligned in a q direction by light radiated on the lower surface.

Referring to FIG. 5, the crosslinked photoreactive material layer 703 is annealed by using the heat source 8, such that the photoreactive material 70 may be uniformly aligned by reorienting the entire photoreactive material 70, to form the photoreactive material layer 700. For example, the main chains may be aligned by aligning the side chains that are not crosslinked in the photoreactive materials 70. This annealing step may be called a post-bake.

A method of radiating light on both surfaces of the annealed composition 702 will be described in detail with reference to FIGS. 6 and 7.

Figure 6:
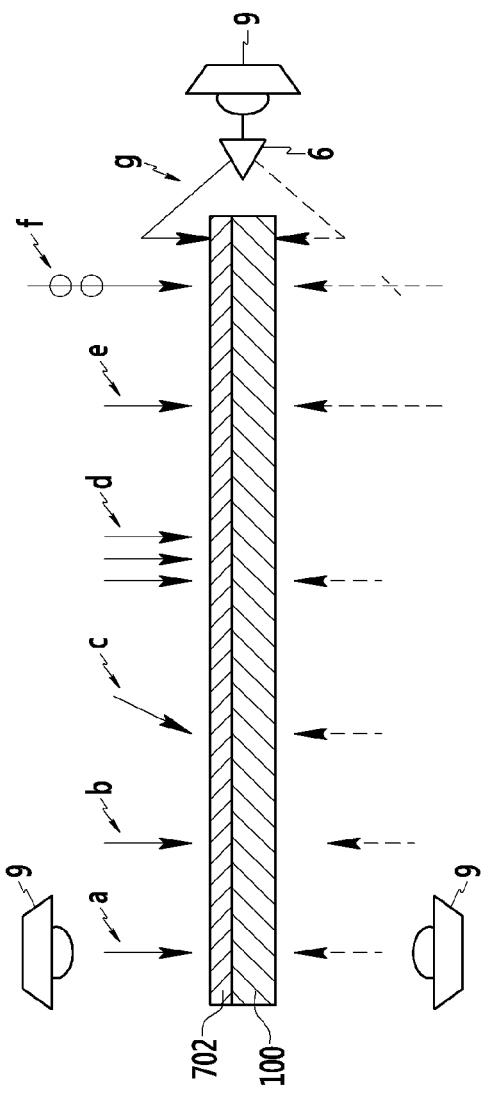
FIG. 6 is a view schematically illustrating an embodiment of a method of radiating light in the method of manufacturing the photoreactive material layer.
Figure 7:
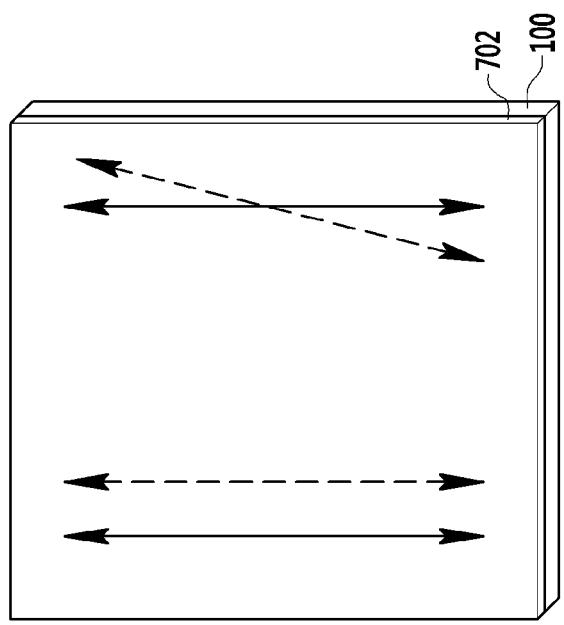
FIG. 7 is a view, schematically illustrating an embodiment of a method of radiating light in the method of manufacturing the photoreactive material layer.

FIG. 6 is a view schematically illustrating an embodiment of a method of radiating light in the method of manufacturing the photoreactive material layer, and FIG. 7 is a view schematically illustrating a method of radiating light in the method of manufacturing the photoreactive material layer.

Referring to FIG. 6, light may be simultaneously emitted from the light sources 9 disposed on the upper and lower surfaces (a). In consideration of a design of a light exposer, light may be sequentially emitted from the light sources 9 disposed on the upper and lower surfaces (b). In consideration of characteristics of the material or surface, light may be emitted from the light sources 9 disposed on the upper and lower surfaces in a direction having an incline with respect to at least one of the upper and lower surfaces (c). In consideration of the characteristics of the substrate or the design of the process, light may be emitted from the light sources 9 disposed on the upper and lower surfaces on the upper and lower surfaces at different energies (d). In consideration of possible damage to upper and lower cross-sections of the substrate, light may be emitted from the light sources 9 disposed on the upper and lower surfaces on the upper and lower surfaces at different wavelengths (e). In consideration of the alignment properties of the upper and lower portions of the annealed composition, light may be polarized and radiated from the light sources 9 disposed on the upper and lower surfaces on the upper and lower surfaces in different manners (f). For example, light may not be polarized, or may be linearly polarized, circularly polarized, or elliptically polarized. Light may be radiated on the upper and lower surfaces by using a single light source 9 and a beam splitter 6 (g).

Referring to FIG. 7, light may be radiated on the upper and lower surfaces to have different azimuths from the light sources 9 disposed on the upper and lower surfaces.

Application of the photoreactive material layer will be described in further detail with reference to FIGS. 1A and 8.

Figure 8:
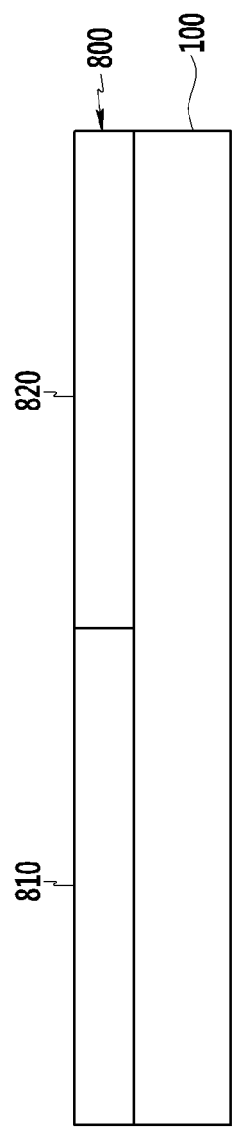
FIG. 8 is a cross-sectional view schematically illustrating an embodiment of the photoreactive material layer.

FIG. 8 is a cross-sectional view schematically illustrating the photoreactive material layer according to another embodiment.

Referring to FIG. 1A, the photoreactive material layer 700 may be a member of a device, such as an alignment layer of a liquid crystal display, a film type patterned retarder ("FPR") of a stereoscopic image display device, a quarter wavelength plate ("QWP") of a stereoscopic image display device, or a polarizer of a liquid crystal display. The film type patterned retarder may be formed by an entire surface exposure without using a mask and an exposure using a patterned mask.

Further, referring to FIG. 8, a photoreactive material layer 800 may include a first quarter wave ("¼λ") layer 810 and a second −¼λ layer 820, and may be applied to a film type patterned retarder or a quarter wavelength plate of a stereoscopic image display device.

Hereinafter, the present disclosure will be described in further detail with reference to Examples, and the following Examples are Examples of the present disclosure but the present disclosure is not limited by the following Examples.

Example 1

The photoreactive material composition including the acryl-based polymer having the cinnamate group represented by the following Formula 1, where m is 7, was applied on the substrate by spin coating (about 1700 revolutions per minute ("rpm"), and about 0.9 micrometers (μm)). The substrate coated with the photoreactive material composition was prebaked at about 80° C. for about 2 min. The ultraviolet light of about 60 millijoules (mJ) was radiated on the upper and lower surfaces of the prebaked photoreactive material composition. Next, the radiated composition was post-baked at about 115° C. for about 20 min.

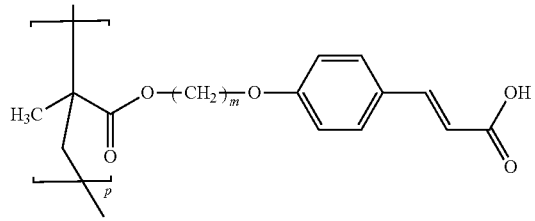

Formula 1

Comparative Example 1

The photoreactive material composition including the acryl-based polymer having the cinnamate group represented by Formula 1 was applied on the substrate by the spin coating method (about 1700 rpm, and about 0.9 μm). The substrate coated with the photoreactive material composition was prebaked at about 80° C. for about 2 min. The ultraviolet light of about 60 mJ was radiated on only the upper surface of the photoreactive material layer. Next, the photoreactive material layer was post-baked at about 115° C. for about 20 min.

Figure 9A:
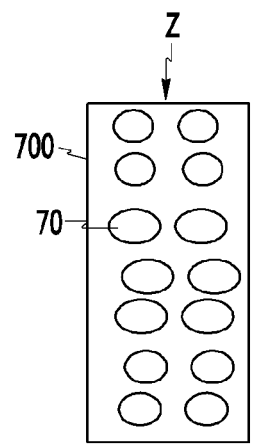
FIGS. 9A and 9B are cross-sectional views schematically illustrating a transverse direction section and a longitudinal direction section, respectively, of the photoreactive material layer of Example 1.
Figure 9B:
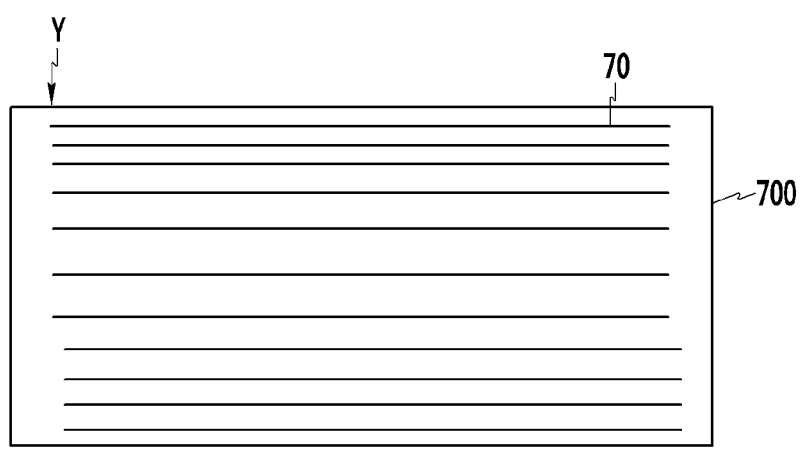
Figure 9C:
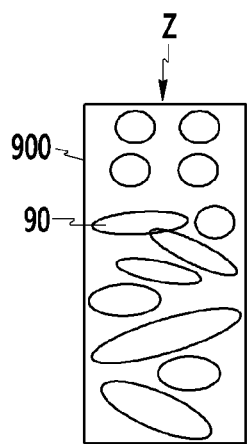
FIGS. 9C and 9D are cross-sectional views schematically illustrating a transverse direction section and a longitudinal direction section, respectively, of the photoreactive material layer of Comparative Example 1.
Figure 9D:
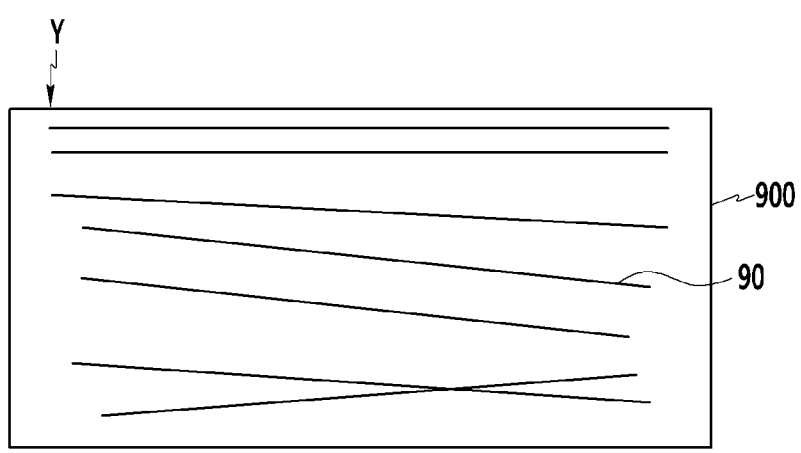

The cross-sectional views of the photoreactive material layer 700 manufactured in Example 1 are illustrated in FIGS. 9A and 9B, and cross-sectional views of the photoreactive material layer 900 manufactured in Comparative Example 1 are illustrated in FIGS. 9C and 9D. FIGS. 9A and 9B are a cross-sectional views schematically illustrating a transverse direction section (Z) and a longitudinal direction section (Y) of the photoreactive material layer of Example 1, respectively, and FIGS. 9C and 9D are a cross-sectional views schematically illustrating a transverse direction section (Z) and a longitudinal direction section (Y) of the photoreactive material layer of Comparative Example 1, respectively. It may be seen that the alignment properties of the photoreactive material 70 of Example 1 are more uniform than the alignment properties of the photoreactive material 90 of Comparative Example 1.

Characteristics of the photoreactive material layers manufactured in Example 1 and Comparative Example 1 were measured, and the results are described in Table 1.

TABLE 1

|  | Example 1 | Comparative Example 1 | Improvement (%) |
|---|---|---|---|
| Phase difference(nm) | 132 | 117 | 13% up |
| Δn | 0.15 | 0.13 | 15% up |
| Black luminance (nit) | 0.4 | 0.7 | 43% down |
| White luminance (nit) | 144 | 121 | 19% up |
| Contrast ratio | 360 | 175 | 106% up |
| 3D black luminance (nit) | 1.96 | 2.74 | 30% down |
| 3D white luminance(nit) | 280 | 240 | 17% up |
| 3D contrast ratio | 143 | 87 | 64% up |

As described in Table 1, the phase difference, the refractive index, the black luminance, the white luminance, and the contrast ratio of Example 1 were improved as compared to those of Comparative Example 1.

Example 2

The same procedure as Example 1 was performed, except that the photoreactive material layer was post-baked at about 120° C. for about 20 min.

Example 3

The same procedure as Example 1 was performed, except that the photoreactive material layer was post-baked at about 125° C. for about 20 min.

Characteristics of the photoreactive material layers manufactured in Examples 1 to 3 were measured, and described in Table 2.

Comparative Example 3

The same procedure as Comparative Example 1 was performed, except that ultraviolet light of about 120 mJ was radiated on only the upper surface of the photoreactive material layer.

Comparative Example 4

The same procedure as Comparative Example 1 was performed, except that ultraviolet light of about 240 mJ was radiated on only the upper surface of the photoreactive material layer.

Figure 10:
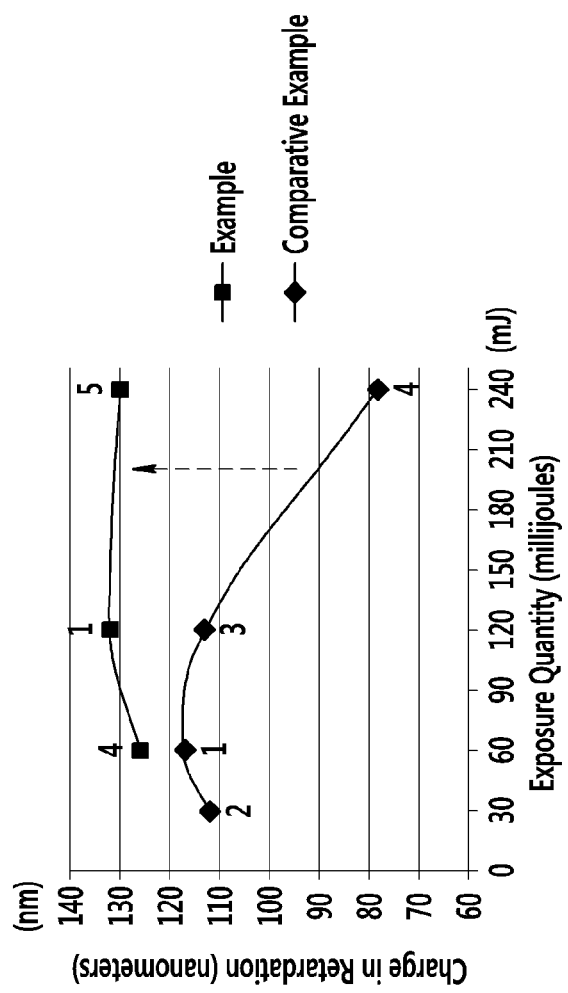
FIG. 10 is a graph of change in retardation (nanometers, m) versus exposure quantity (millijoules, mJ)
Figure 11:
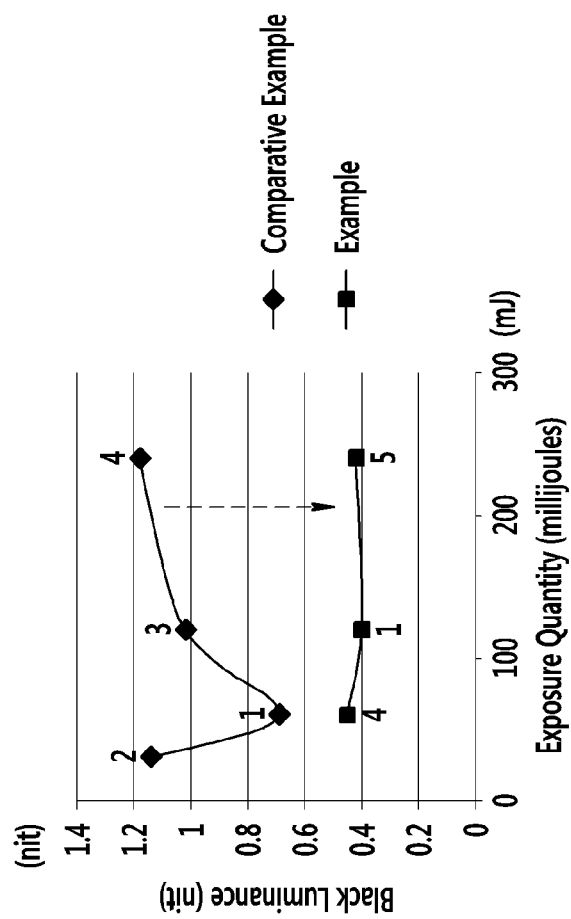
FIG. 11 is a graph of change in black value (nit) versus exposure quantity (millijoules, mJ).

Characteristics of the photoreactive material layers manufactured in Examples 1, 4, and 5 and Comparative Examples 1 to 4 were measured, and the results are described in Table 3. Further, the graph of retardation versus exposure quantity and the graph of black luminance versus exposure quantity are illustrated in FIGS. 10 and 11, respectively.

TABLE 3

|  | Ex 4 | Ex 1 | Ex 5 | CEx 2 | CEx 1 | CEx 3 | CEx 4 |
| --- | --- | --- | --- | --- | --- | --- | --- |
| Exposure quantity (mJ) | 30 + 30 | 60 + 60 | 120 + 120 | 30 | 60 | 120 | 240 |
| Phase difference (nm) | 126 | 132 | 130 | 112 | 117 | 113 | 78 |
| Δn | 0.15 | 0.15 | 0.15 | 0.13 | 0.13 | 0.14 | 0.09 |
| Black luminance (nit) | 0.45 | 0.4 | 0.42 | 1.14 | 0.7 | 1.02 | 1.18 |
| White luminance (nit) | 138 | 144 | 143 | 112 | 121 | 114 | 65 |
| Contrast ratio | 306 | 360 | 341 | 98 | 175 | 111 | 55 |

TABLE 2

|  | Example 1 | Example 2 | Example 3 |
| --- | --- | --- | --- |
| Phase difference(nm) | 132 | 137 | 140 |
| Δn | 0.15 | 0.16 | 0.16 |
| Black luminance (nit) | 0.4 | 0.53 | 0.66 |
| White luminance (nit) | 144 | 148 | 150 |
| Contrast ratio | 360 | 279 | 227 |
| 3D black luminance (nit) | 1.96 | 2.11 | 2.56 |
| 3D white luminance(nit) | 280 | 287 | 292 |
| 3D contrast ratio | 143 | 136 | 114 |

As described in Table 2, it may be seen that the characteristics of the photoreactive material layer are improved even though the temperature of the post-baking was changed.

Example 4

The same procedure as Example 1 was performed, except that ultraviolet light of about 30 mJ were radiated on the upper and lower surfaces of the photoreactive material layer, respectively.

Example 5

The same procedure as Example 1 was performed, except that the ultraviolet light of about 120 mJ was radiated on the upper and lower surfaces of the photoreactive material layer, respectively.

Comparative Example 2

The same procedure as Comparative Example 1 was performed, except that ultraviolet light of about 30 mJ was radiated on only the upper surface of the photoreactive material layer.

In Table 3, "Ex" refers to Example, and "CEx" refers to Comparative Example.

As shown in Table 3 and FIGS. 10 and 11, it may be seen that the alignment characteristic of the photoreactive material layer is improved, even when the small exposure quantity is used.

According to the exemplary embodiments, it is possible to improve an alignment characteristic of a photoreactive material in a layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A photoreactive material layer comprising:
   uniformly aligned crosslinked photoreactive material,
   wherein the uniformly aligned crosslinked photoreactive material of an upper portion of the photoreactive material layer and the uniformly aligned crosslinked photoreactive material of a lower portion of the photoreactive material layer are aligned in a same direction, and
   wherein the photoreactive material includes one or more selected from a photoreactive liquid polymer, an acrylic compound, a methacrylene compound, a siloxane compound, and a maleimide compound.

2. The photoreactive material layer of claim 1, wherein the uniformly aligned crosslinked photoreactive material of the upper portion of the photoreactive material layer and the uniformly aligned crosslinked photoreactive material of the lower portion of the photoreactive material layer each comprise a vertical functional group.

3. A method of manufacturing a photoreactive material layer, the method comprising:

coating a photoreactive material composition comprising a photoreactive material on a substrate, annealing the photoreactive material composition to form an annealed composition, radiating ultraviolet light on an upper surface and a lower surface of the annealed composition to form a crosslinked photoreactive material, and annealing the crosslinked photoreactive material to manufacture the photoreactive material layer, wherein a photoreactive material layer comprises a uniformly aligned crosslinked photoreactive material, wherein the uniformly aligned crosslinked photoreactive material of an upper portion of the photoreactive material layer and the uniformly aligned crosslinked photoreactive material of a lower portion of photoreactive material layer are aligned in a same direction, and wherein the photoreactive material includes one or more selected from a photoreactive liquid polymer, an acrylic compound, a methacrylene compound, a siloxane compound, and a maleimide compound.

4. The method of manufacturing the photoreactive material layer of claim 3, wherein:
the radiating of ultraviolet light crosslinks the photoreactive material.

5. The method of manufacturing the photoreactive material layer of claim 3, wherein the uniformly aligned crosslinked photoreactive material of the upper portion of the photoreactive material layer and the uniformly aligned crosslinked photoreactive material of the lower portion of the photoreactive material layer each comprise a vertical functional group.

6. The method of manufacturing the photoreactive material layer of claim 3, wherein:
the radiating of ultraviolet light comprises radiating light simultaneously or sequentially on the upper surface and the lower surface of the annealed composition.

7. The method of manufacturing the photoreactive material layer of claim 3, wherein:
the ultraviolet light is radiated in an inclination direction on at least one of the upper surface and the lower surface of the photoreactive material layer.

8. The method of manufacturing the photoreactive material layer of claim 3, wherein:
the ultraviolet light is radiated on the upper surface and the lower surface of the photoreactive material layer by light sources having different energies or light sources having different wavelengths.

9. The method of manufacturing the photoreactive material layer of claim 3, wherein:
the ultraviolet light is radiated on the upper surface and the lower surface of the photoreactive material layer by differently polarized light sources.

10. The method of manufacturing the photoreactive material layer of claim 3, wherein:
the ultraviolet light is radiated on the upper surface and the lower surface of the photoreactive material layer by a single light source and a beam splitter.

11. The method of manufacturing the photoreactive material layer of claim 3, wherein:
the ultraviolet light is radiated on the upper surface and the lower surface of the photoreactive material layer to have different azimuths.

12. The photoreactive material layer of claim 1, wherein the photoreactive material includes a moiety represented by Formula 1:

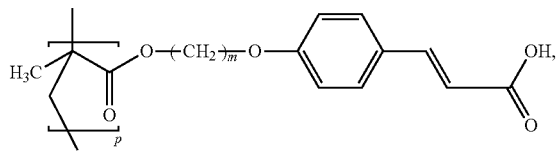

Formula 1 wherein in Formula 1,
m is 7, and
p is a number of repeating units.

13. The method of manufacturing a photoreactive material layer of claim 3,
wherein the photoreactive material includes a moiety represented by Formula 1:

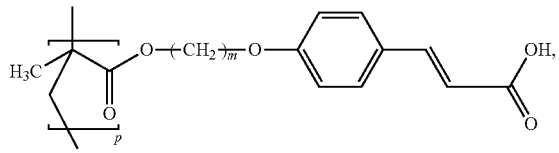

Formula 1 wherein in Formula 1,
m is 7, and
p is a number of repeating units.

14. The photoreactive material layer of claim 2, wherein:
the vertical functional group is selected from one or more of a $C_1$-$C_{25}$ alkylene group substituted by a $C_1$-$C_{10}$ alkyl group or a $C_1$-$C_{10}$ alkoxy group, a $C_1$-$C_{25}$ arylene group substituted by an alkyl group or a $C_1$-$C_{10}$ alkoxy group, a $C_1$-$C_{25}$ cyclohexylene group substituted by a $C_1$-$C_{10}$ alkyl group or a $C_1$-$C_{10}$ alkoxy group, an imide ring group, a steroid group, an aromatic liquid crystal group, or a cholesteric group.

15. The photoreactive material layer of claim 1, wherein the uniformly aligned crosslinked photoreactive material of the upper portion of the photoreactive material layer and the uniformly aligned crosslinked photoreactive material of the lower portion of the photoreactive material layer each comprises a photoreactive group.

16. The photoreactive material layer of claim 15, wherein:
the photoreactive group is selected from one or more of an azo functional group, a cinnamate functional group, a chalcone functional group, a coumarin functional group, a maleimide functional group, or a stilbene functional group.

17. The method of manufacturing the photoreactive material layer of claim 5, wherein:
the vertical functional group is selected from one or more of a $C_1$-$C_{25}$ alkylene group substituted by a $C_1$-$C_{10}$ alkyl group or a $C_1$-$C_{10}$ alkoxy group, a $C_1$-$C_{25}$ arylene group substituted by an alkyl group or a $C_1$-$C_{10}$ alkoxy group, a $C_1$-$C_{25}$ cyclohexylene group substituted by a $C_1$-$C_{10}$ alkyl group or a $C_1$-$C_{10}$ alkoxy group, an imide ring group, a steroid group, an aromatic liquid crystal group, or a cholesteric group.

18. The method of manufacturing the photoreactive material layer of claim 3, wherein the uniformly aligned crosslinked photoreactive material of the upper portion of the photoreactive material layer and the uniformly aligned crosslinked photoreactive material of the lower portion of the photoreactive material layer each comprises a photoreactive group.

19. The photoreactive material layer of claim 18, wherein:
the photoreactive group is selected from one or more of an azo functional group, a cinnamate functional group, a chalcone functional group, a coumarin functional group, a maleimide functional group, or a stilbene functional group.

\* \* \* \* \*